US008782038B2

(12) United States Patent
Mishra et al.

(10) Patent No.: US 8,782,038 B2
(45) Date of Patent: Jul. 15, 2014

(54) SYSTEMS AND METHODS FOR ONLINE COMPATIBILITY MATCHING AND RANKING

(75) Inventors: Arvind Mishra, Los Angeles, CA (US); Greg Steiner, Los Angeles, CA (US); Ashley Lewis, Los Angeles, CA (US); Cormac Twomey, Los Angeles, CA (US); Joseph Essas, Los Angeles, CA (US); Ryan Barker, Los Angeles, CA (US)

(73) Assignee: Eharmony, Inc., Santa Monica, CA (US)

( * ) Notice: Subject to any disclaimer, the term of this patent is extended or adjusted under 35 U.S.C. 154(b) by 77 days.

(21) Appl. No.: 13/452,245

(22) Filed: Apr. 20, 2012

(65) Prior Publication Data

US 2013/0282745 A1 Oct. 24, 2013

(51) Int. Cl.
*G06F 17/30* (2006.01)

(52) U.S. Cl.
USPC ........................................ 707/723; 705/319

(58) Field of Classification Search
USPC .................. 705/319; 707/719–728, 748–758
See application file for complete search history.

(56) References Cited

U.S. PATENT DOCUMENTS

2006/0059147 A1* 3/2006 Weiss et al. .................... 707/6
2007/0073711 A1* 3/2007 Terrill et al. .................. 707/10
2007/0186007 A1* 8/2007 Field et al. .................. 709/233
2008/0154899 A1* 6/2008 Carmony ........................ 707/6
2008/0248829 A1* 10/2008 Zilca et al. ............... 455/552.1
2008/0270038 A1* 10/2008 Partovi et al. ................ 702/19
2009/0075738 A1* 3/2009 Pearce .......................... 463/42
2009/0164464 A1* 6/2009 Carrico et al. ................. 707/5
2010/0125530 A1* 5/2010 Terrill et al. ................ 705/319
2011/0178879 A1* 7/2011 Tuck et al. ................ 705/14.73
2011/0252238 A1* 10/2011 Abuan et al. ................ 713/168
2011/0252340 A1* 10/2011 Thomas ...................... 715/756
2012/0005238 A1* 1/2012 Jebara et al. ................ 707/798
2012/0011189 A1* 1/2012 Werner et al. ............... 709/202
2012/0017266 A1* 1/2012 DiChiara et al. ................ 726/4
2012/0072382 A1* 3/2012 Pearson et al. ................ 706/13
2012/0185539 A1* 7/2012 Zhu et al. .................... 709/204
2012/0191844 A1* 7/2012 Boyns et al. ................ 709/224
2012/0207690 A1* 8/2012 Weill et al. .................... 424/64
2012/0311686 A1* 12/2012 Medina et al. .................. 726/7
2013/0090130 A1* 4/2013 Burrell et al. ............. 455/456.1
2013/0166643 A1* 6/2013 Essas .......................... 709/204

* cited by examiner

*Primary Examiner* — Wilson Lee
(74) *Attorney, Agent, or Firm* — One LLP

(57) ABSTRACT

The field of the invention relates to systems and methods for operation of a matching service, and more particularly to systems and methods that enable online compatibility matching and ranking. In a preferred embodiment, the system includes a matching system server coupled to a public network and accessible to one or more users. The matching system server includes a database that stores match profile data associated with the one more users, wherein the match profile data includes self-identified preferences. The matching server system is configured to correlate a first user's match profile data with one or more of the plurality of users' match profile data to identify a set of potential matches for the first user based on a relaxed set of self-identified preferences and calculate a compatibility value for each match in the set of potential matches.

4 Claims, 5 Drawing Sheets

SYSTEMS AND METHODS FOR ONLINE COMPATIBILITY MATCHING AND RANKING

FIELD OF THE INVENTION

The field of the invention relates to systems and methods for operation of a matching service, and more particularly to systems and methods that enable online compatibility matching and ranking.

BACKGROUND OF THE INVENTION

Research has shown that the success of human interpersonal relationships depends on complex interactions between a large number of variables including, but not limited to, personality, socioeconomic status, religion, appearance, ethnic background, energy level, education, interests and appearance. Matching services have developed effective systems that analyze these variables to identify and match people who have the potential to establish a successful relationship. A well-known example of such a service is eHarmony, Inc. (which can be found at www.eharmony.com). A matching service generally collects and stores data to create a "profile" for each user. The profile includes a number of factors potentially relevant to establishing a successful interpersonal relationship with that user. The matching service then correlates that user's profile with others in its database to assess which profiles are compatible, i.e., which users have the potential for a successful relationship when matched.

Many of these matching services are focused on self-identified traits and preferences, such as physical appearance, occupation, religion, sexual orientation, and geographical region. However, systems that focus solely on these self-identified traits and preferences can prevent possible matches between individuals that may be compatible yet fail to meet certain self-identified criteria. For example, two individuals may share deep psychological traits, such as curiosity and interests, that may not be self-identified. These individuals may have strong potential for a successful relationship, but if these individuals do not share certain self-identified traits and preferences, existing match systems may not ever connect them. Accordingly, alternative systems and methods for facilitating interpersonal relationships may be desirable.

SUMMARY OF THE INVENTION

The field of the invention relates to systems and methods for operation of a matching service, and more particularly to systems and methods that enable online compatibility matching and ranking.

In a preferred embodiment, the system includes a matching system server coupled to a public network and accessible to one or more users. The matching system server includes a database that stores match profile data associated with the one more users, wherein the match profile data includes self-identified preferences. The matching server system is configured to correlate a first user's match profile data with one or more of the plurality of users' match profile data to identify a set of potential matches for the first user based on a relaxed set of self-identified preferences and calculate a compatibility value for each match in the set of potential matches.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Preferred Systems

Figure 1A:
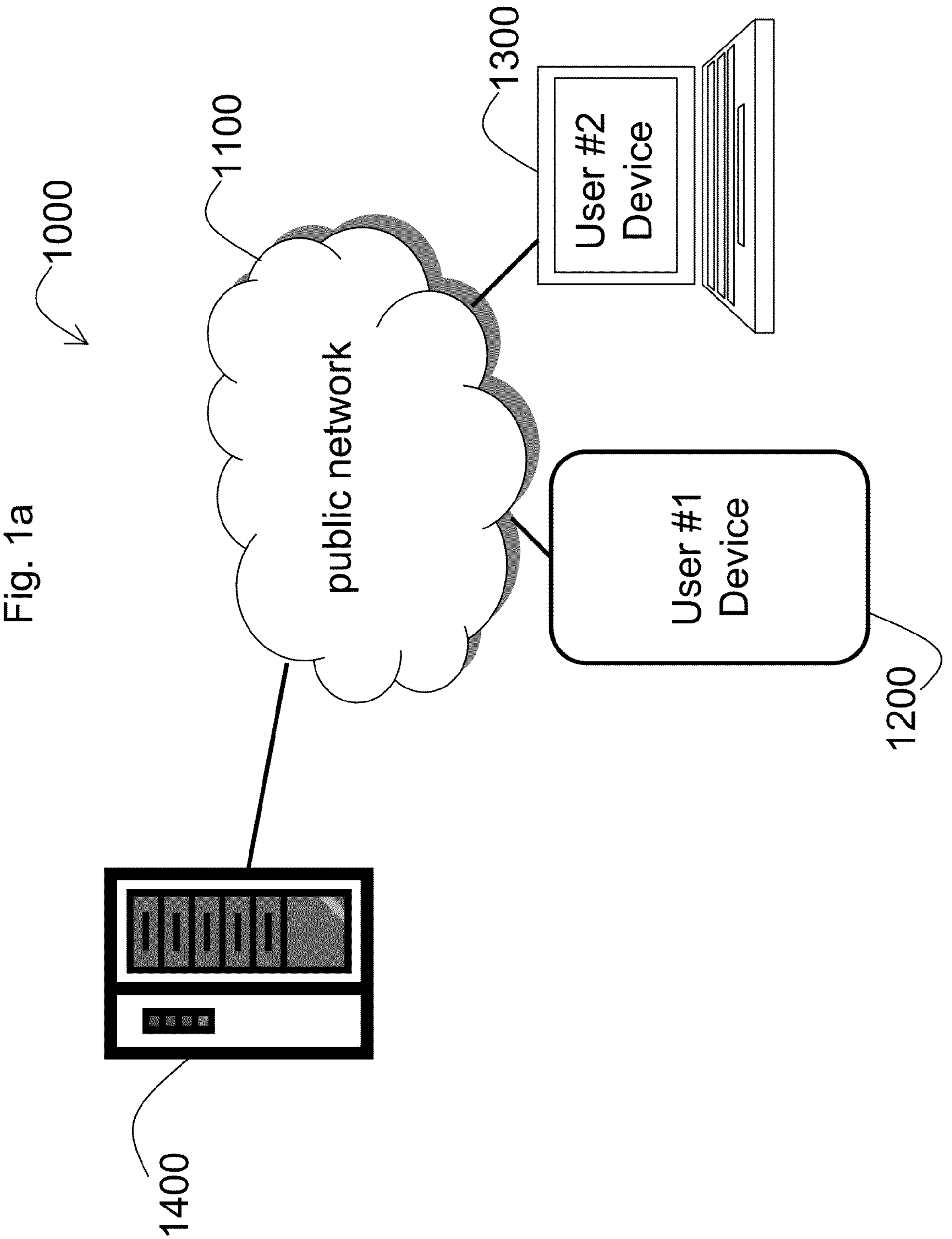
FIG. 1*a* is an exemplary diagram of an online interpersonal match system in accordance with a preferred embodiment of the present invention.

Turning to FIG. 1*a*, a computer-based compatibility matching system 1000 in accordance with a preferred embodiment of the present invention is shown. The system 1000 generally includes a matching server system 1400, which may distributed on one or more physical servers, each having processor, memory, an operating system, and input/output interface, and a network interface all known in the art, and a plurality of end user computing devices 1200/1300 coupled to a public network 1100, such as the Internet and/or a cellular-based wireless network.

Figure 1B:
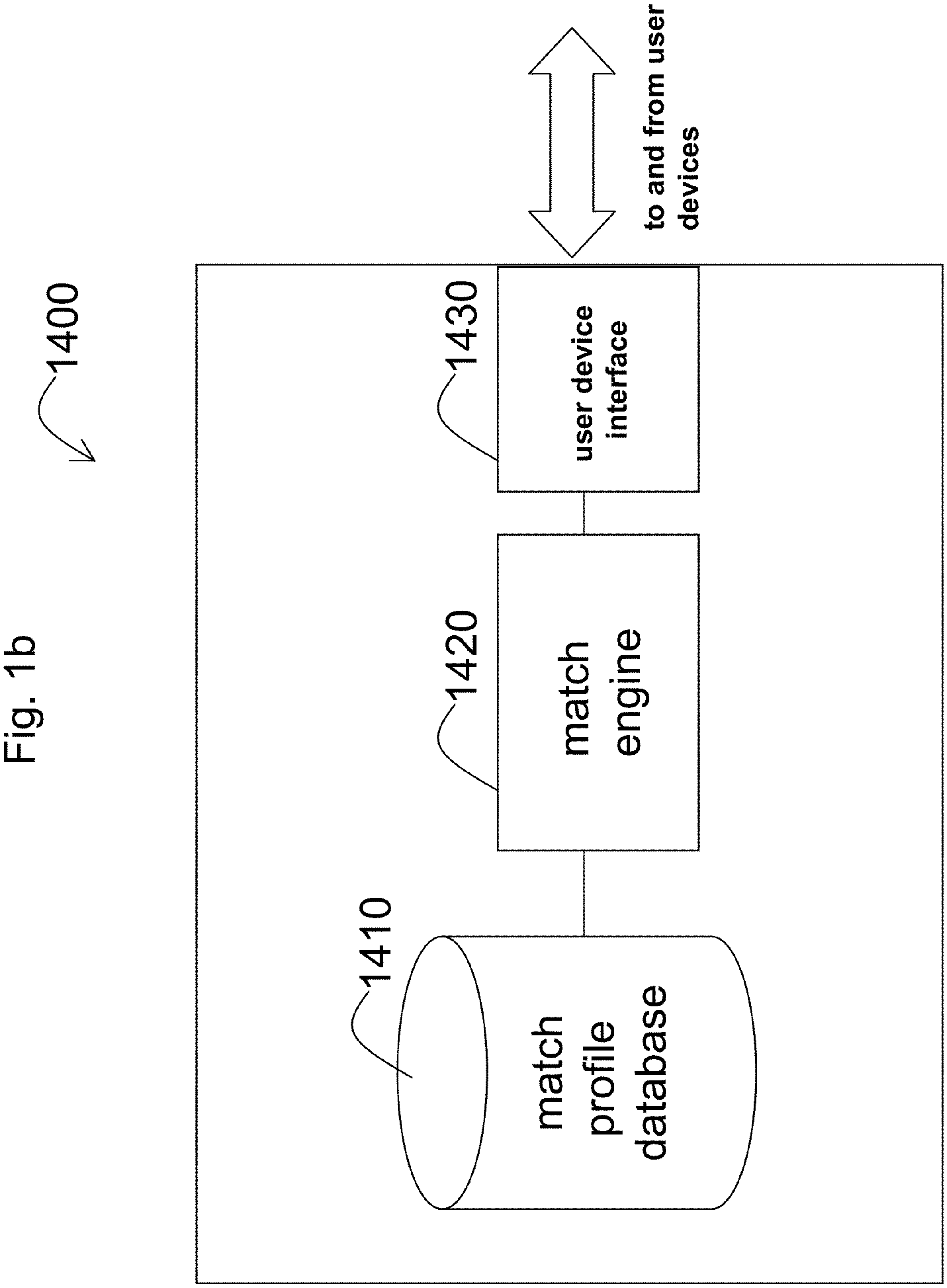
FIG. 1*b* is an exemplary diagram of a matching system server in accordance with a preferred embodiment of the present invention.

Turning to the matching server system 1400, an exemplary embodiment is shown in FIG. 1*b*. Generally, a matching server system 1400 includes a computer application designed to match users to the system 1400 who have the potential to establish a successful interpersonal relationship. To obtain potential matches, each user establishes a "match profile" that includes data and factors potentially relevant to establishing a successful interpersonal relationship with that user. These factors can be organized into three major categories (1) physical attraction; (2) interpersonal interests, traits and preferences that are self-identified, such as hobbies, geographical location, occupation, and sexual orientation; and (3) deep psychological traits and preferences, such as curiosity and interests that may not be self-identified. These factors are generated from empirical data collected from the user, e.g., through questionnaires. An exemplary approach to establishing a match profile for a user is described in detail in U.S. Pat. No. 7,454,357, issued to J. Galen Buckwalter et. al. on Nov.

18, 2008, which is hereby incorporated by reference in its entirety ("the Buckwalter patent").

These match profiles are stored in a match profile database 1410 and organized by the user's match profile identification ("ID"). In the process of creating potential matches for a particular user, a match engine 1420 queries the user's match profile by its respective ID, and correlates that profile with other profiles to calculate a compatibility value. If two profiles generate a compatibility value that meets a predefined threshold, then there is potential for the two respective users to have a satisfactory and/or successful interpersonal relationship if matched. This calculation can also incorporate data based on a user's previous history of matches and satisfaction rate as well as the history of other users with comparable empirical data, thereby enabling a feedback system that allows the system 1000 to "learn" how to optimize the correlation calculation. This process can also involve developing and utilizing a "neural network" to resolve problems in complex data. Details of this calculation and correlation process and the neural network are also described in the Buckwalter patent, which describes an exemplary compatibility value in the form of a "satisfaction index."

Preferably, the match engine 1420 is configured to generate more than one compatibility value between two or more correlated match profiles, where each compatibility value is associated with a different type of relationship, e.g., dyadic, romantic, friendship, business, social, recreational, team oriented, long-term, or short term (e.g., minutes, hours, days, or months). Each type of relationship may involve the correlation of different factors and/or different weighting of factors from the various categories described above.

Figure 2:
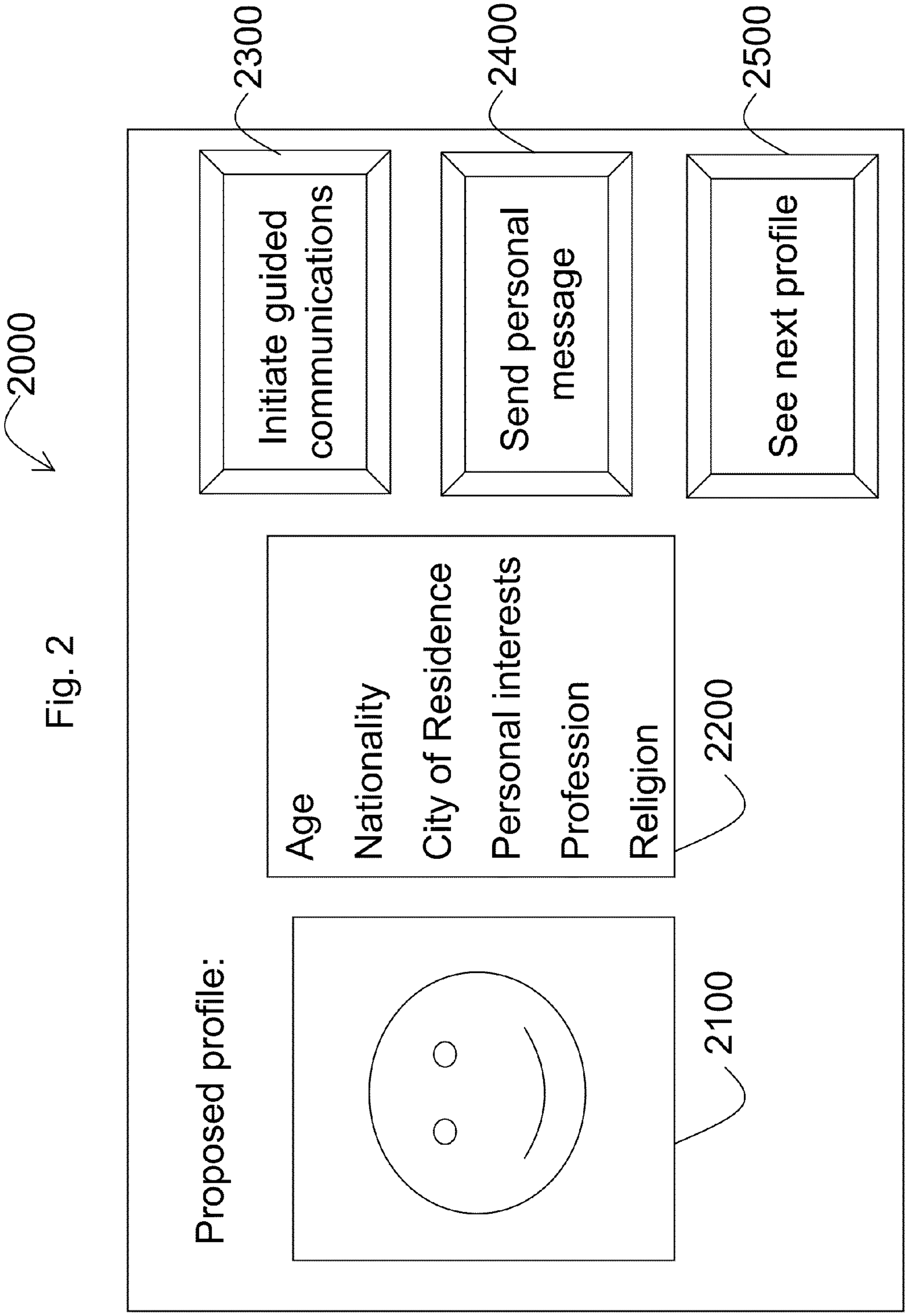
FIG. 2 is an exemplary user interface in accordance with a preferred embodiment of the present invention.

Turning to FIG. 2, a user interface 2000 on a user's device 1200/1300 in accordance with a preferred embodiment is shown. The user interface 2000 is part of an application on the user's device 1200/1300, e.g., a downloaded webpage, configured to operatively communicate with the matching server system 1400 via the public network 1100. The user interface 2000 on a first user's device 1200 is configured to present profile information of a second user that may be compatible with the first user, e.g., in accordance with the calculations described above and in the Buckwalter patent. The profile information may include a photo of the second user 2100, basic information 2200 such as age, nationality, city of residence, personal interests, profession, religion and other self-identified traits 2200. The user interface 2000 also includes a number of options for the first user in the form of graphical buttons. A first button 2300 enables the first user to initiate guided communications with the second user. For instance, a pre-determined set of questions may be sent to the second user to initiate communication, e.g., an email or link to an interactive web page. Example questions include: "If you decided to stay at home for the evening would you tend to:"; "Which of the following indoor activities sounds like the most fun to you?"; "How often do you find yourself laughing?"; "What's your philosophy on travel?"; and "Are you a passionate person?". Further, the answers may be multiple choice in a preferred embodiment. A second button 2400 enables the first user to initiate communications with the second user by sending a personal message and perhaps additional media, such as audio and/or video. And, a third button 2500 enables the first user to forego communications and instead request review of another compatible profile. An exemplary user interface 2000 is provided at www.eharmony.com for eHarmony's "WhatIf" feature, commercially released in August, 2011.

Preferred Processes

Figure 3:
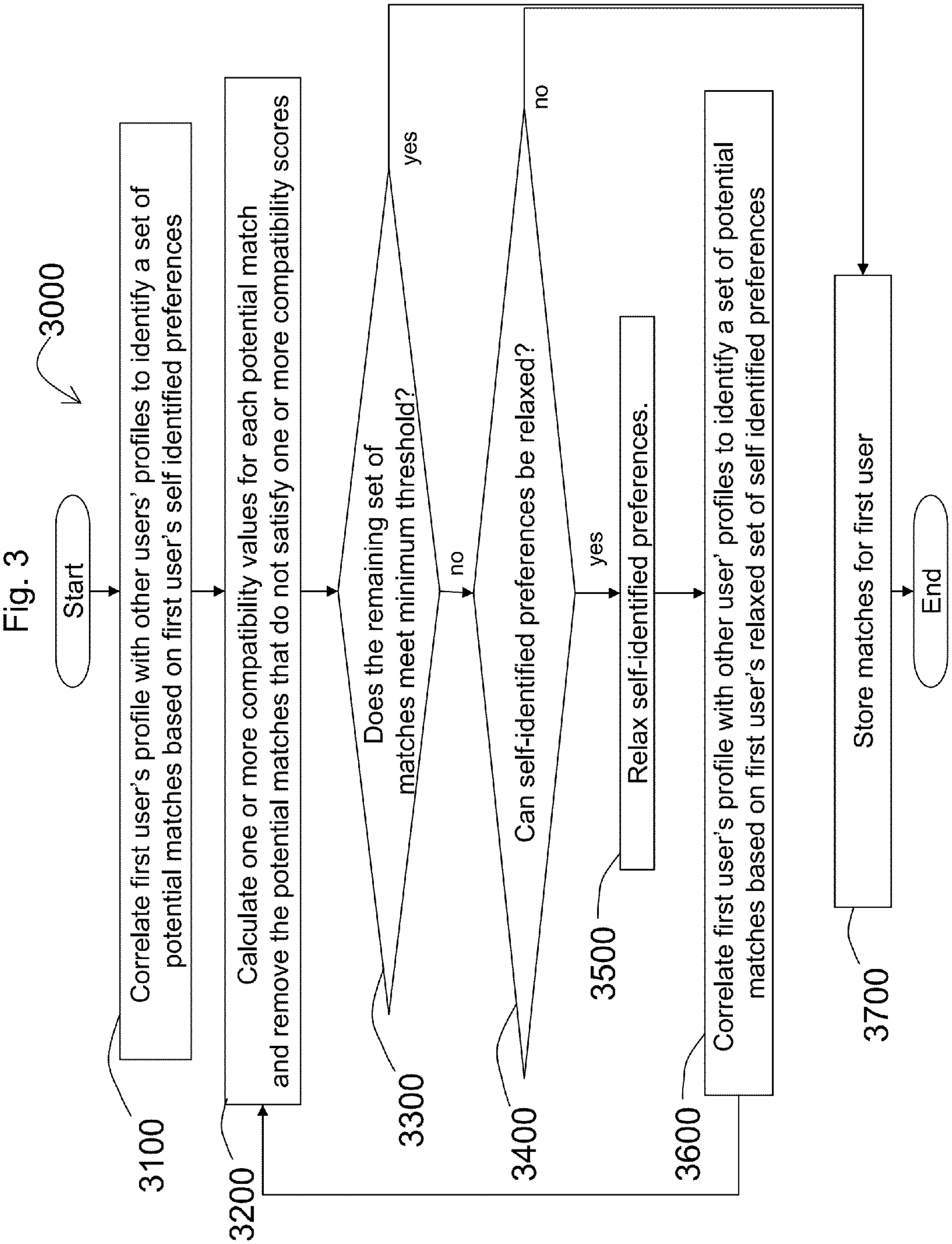
FIG. 3 is an exemplary process of a matching system in accordance with a preferred embodiment of the present invention.

Turning to FIG. 3, a description of the operation 3000 of the compatibility matching system 1000 is shown. Generally, as mentioned above, a user will rely on the service 1400 to match the user with someone potentially compatible. To that end, it is common for users to identify certain traits and characteristics in a preferred match. For instance, a first user may identify a particular ethnicity, geographic region, religion, age range, whether someone has children, whether someone smokes, and/or whether someone consumes alcohol on regular basis. Each of these self-identified preferences is stored in the user's match profile within the database 1410. Moreover, the user may assign a level of importance for each preference. For example, a user may place a higher importance on geographic region than whether a person smokes. In such a case, the user may be given a range of numerical values from 1 to 7, with 7 representing highest level of importance, and assign 7 to geographic region and 1 to smoking preference. This importance data may also be stored with the profile in the database 1410.

Upon a first user's request, the match engine 1420 within the matching server system 1400 correlates the first user's profile data from the database 1410 with other user profiles. This correlation will attempt to identify potential matches based on the self-identified preferences, such as those described above (Action Block 3100). For each match, one or more compatibility values are calculated, for example, in accordance with the methodologies described above and in the Buckwalter patent incorporated by reference, whereby the potential matches that fail to satisfy certain compatibility scores are removed from the set of potential matches (Action Block 3200).

In some cases, certain self-identified preferences may be extremely limiting for a user. For example, a certain geographic region may have a small number of people of a certain ethnicity and/or religion. In yet another example, the preferences may not match both ways. For instance, the first user may not have traits and preferences identified by other users. Thus, even if a second user meets all of the preferences identified by the first user, a match may not occur because the first user failed to meet the second user's preferences. In such cases, only a small number of potential matches may be identified. Moreover, after removing the matches that fail to satisfy the certain compatibility scores, the number of potential matches drop further.

If the system 1400 does not generate a minimum number of potential matches (or pairings), e.g., 65, that satisfy certain compatibility scores for the first user based on the current set of self-identified preferences (Decision Block 3300), then it may desirable to have the system 1400 attempt to relax the current set of self-identified preferences (Action Block 3500) if the option is available (Decision Block 3400) to attempt to generate the minimum number of potential matches (or pairings) for the first user. As one can appreciate, a correlation performed with less self-identified preferences will effectively broaden the scope of potential matches (one way or multiple ways), and additional potential matches may be generated for that first user with other users that nonetheless have traits desirable to that first user if not all of the self identified preferences are included, one way or both ways.

Figure 4:
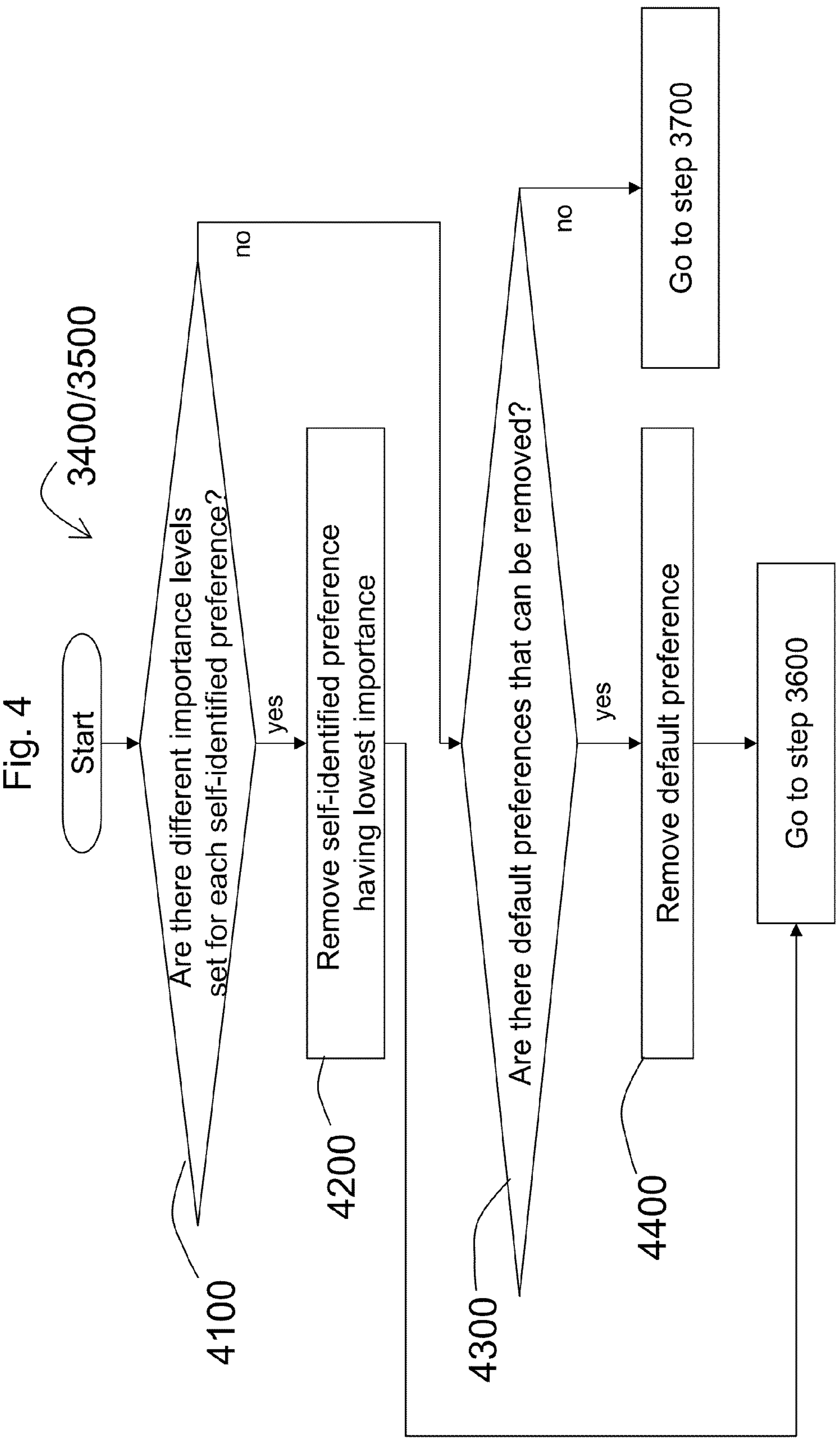
FIG. 4 is another exemplary process of a matching system in accordance with a preferred embodiment of the present invention.

One approach to assess whether relaxing the self-identified preferences is available and to perform the relaxation step is shown in FIG. 4 (3400/3500). In this approach, the system 1400 determines whether the first user assigned different importance levels to the different self-identified preferences (Decision Block 4100). If so, then the system 1400 removes the self-identified preference having the lowest importance level assigned (Action Block 4200). If not, then the system 1400 determines whether a default preference can be removed (Decision Block 4300), e.g., the system 1400 determines whether there are still multiple preferences left in the set of self-identified preferences after several iterations of relaxation occurs. If so, then the default preference is removed (Action Block 4400).

After the current set of self-identified preferences has been relaxed (e.g., one preference has been removed) (Action Block 3500), then the first user's profile is correlated with other users' profiles to identify another set of potential matches based on the first user's relaxed set of self-identified preferences (Action Block 3600), and compatibility values for each potential match are calculated again (Action Block 3200). Further, the loop continues until (1) a minimum number of pairing is created (Decision Block 3300), or (2) if the self-identified preferences can no longer be relaxed further (Decision Block 3400). In such cases, the remaining set of potential matches are then stored in the database 1410 to be retrieved by the user, e.g., via User Interface 2000, or the system 1400 sends the set of matches to the first user.

In a preferred embodiment, other relaxation approaches may be used. For example, a reciprocal process may occur, where the self-identified preferences for the other user may be relaxed. This may occur at any time in the relaxation process (3400/3500) above. Further, the relaxation process may remove all of the explicit starting self-identified preferences. For instance, the active learning process in Buckwalter may identify a user's self-identified preferences based on the user's history of interaction with the system 1400 (for example, a pattern of particular traits are selected by the first user in selecting potential matches). In yet another example, another relaxation approach may depend on the mathematical distance between users' self-identified preferences. For example, a user may select a level of importance for religious preference between 1 and 5. One relaxation process will match that user with another user having a religious preference within a certain range if not the same level, e.g., within +1/−1. Thus, if the first user specifies a 3, then the relaxation process may match that user with another user that specifies a 2 or 4 for that same preference.

If a large number of potential matches are identified, then in a preferred embodiment, the matched users are sorted by the calculated compatibility values. The user may then initiate communication with the matched user as described above.

As noted above and in the Buckwalter patent, the compatibility value may incorporate deep psychological traits and preferences, such as curiosity and interests that may not be self-identified. Such a compatibility value may indicate the probability that the users in a potential match may establish a successful relationship with each other, e.g., a long-term romantic relationship or a business partnership. The process above not only provides a user with an optimum match, for example a second user that a first user has a high probability of establishing a successful long-term relationship with, but the system 1400 may also provide such a match with one or more second users that do not meet all self-identified preferences, therefore expanding the possible ideal matches for that user.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for interpersonal relationships; however, the invention can be used for any relationship in general. Additionally and obviously, features may be added or subtracted as desired. Accordingly, the invention is not to be restricted except in light of the attached claims and their equivalents.

What is claimed is:

1. A computer-based system for presenting interpersonal relationship analysis, comprising:

a matching server system, operatively coupled to a public network, having a database that stores match profile data associated with a plurality of users, wherein the match profile data includes self-identified preferences, each defined as a specific numerical value, and a previous history of matches and satisfaction rate, wherein the matching server system is configured to:

compare the self-identified preferences of a first user's match profile data with the match profile data of one or more other users;

calculate a mathematical distance between the self-identified preferences of the first user and the match profile data of the one or more other users, wherein the mathematical distance is a quantitative difference between the numerical values of the first user's self-identified preferences and corresponding numerical values of the match profile data of the one or more other users;

identify an initial set of potential matches for the first user based on a maximum distance between the self-identified preferences of the first user and the match profile data of the one or more other users;

calculate one or more compatibility values for each potential match in the initial set of potential matches, wherein the one or more compatibility values are calculated based, at least in part, on the previous history of matches and satisfaction rate of each match in the initial set and the first user, and remove each potential match that does not satisfy one or more minimum compatibility values;

if the number of potential matches does not meet a minimum threshold value, then identify an expanded set of potential matches for the first user by increasing the maximum distance.

2. The computer-based system of claim 1, wherein the matching server system is further configured to sort each potential match by compatibility value.

3. The computer-based system of claim 1, wherein the matching server system enables a first user to initiate electronic communication with a potential match that satisfies one or more compatibility scores.

4. The computer-based system of claim 1, wherein the self-identified preferences are assigned different importance levels by the first user.

* * * * *